Dec. 12, 1961  R. C. MIEDING  3,012,796
TRAILERS FOR BICYCLES
Filed Aug. 19, 1959

INVENTOR.
Raymond C. Mieding,
BY Morsell + Morsell
ATTORNEYS.

United States Patent Office 3,012,796
Patented Dec. 12, 1961

3,012,796
TRAILERS FOR BICYCLES
Raymond C. Mieding, 1515 E. Lake Bluff,
Milwaukee 11, Wis.
Filed Aug. 19, 1959, Ser. No. 834,708
2 Claims. (Cl. 280—204)

This invention relates to improvements in trailers for bicycles, and more particularly to an improved trailer adapted to be removably attached to the rear of a bicycle for transporting newspapers or the like.

As is well known, newspaper delivery boys often use bicycles in order to save time in making their deliveries, and for this purpose a wire basket is usually mounted on the front of the delivery boy's bike to hold the papers. Such baskets are helpful, of course, but they have certain shortcomings and are not entirely satisfactory for their intended purpose. In many cases, for example, the basket is not large enough to accommodate the entire load of papers and it is necessary for the delivery boy to make two or more trips to his loading point. This is especially true on Sundays or other days when the papers are larger than usual. Moreover, the mounting of a loaded basket on the front of a bike obstructs the rider's view of the road and impairs his safety. In addition, with the basket on the front of the bike, it is difficult to turn quickly to avoid hazards in the road. The mounting of a loaded basket directly over the front wheel also places considerable strain on the front tire, causing the tire to blow out or to become worn through in a relatively short time. In addition to these failings, conventional bicycle baskets are necessarily attached to the bike in a permanent or semi-permanent manner and cannot be readily removed when it is desired to use the bike for other, normal activities.

With the above in mind, therefore, the general objects of the present invention are to provide a bicycle trailer attachment, for carrying newspapers and the like, which has a large capacity, which compact device does not affect the maneuverability of the bike, which can be quickly and easily mounted on and detached from the bike, and which device places relatively little strain on the bicycle tires.

A more specific object of the present invention is to provide a two-wheeled trailer attachment for bicycles which partially surrounds the rear wheel of the bike, minimizing the drag load and promoting the maneuverability of the bike, while providing a safe load capacity considerably larger than that of a conventional, front-mounted container.

A further specific object of the present invention is to provide a trailer attachment adapted to be mounted above and partially around the rear wheel of a bicycle, as described, wherein substantially the entire weight of the load is borne by the trailer wheels, said trailer having a cantilevered frame suspension whereby an increase in the load over the rear wheel of the bike does not increase the strain thereon.

A further specific object is to provide a trailer attachment for bikes wherein the trailer is designed to support the bike in an upright position when the bike is not in motion, eliminating the necessity for the delivery boy having to stand the bike up each time he dismounts.

A further object is to provide a trailer device for bicycles, as described, wherein the trailer is designed to stand upright even when not attached to a bike, permitting the newspaper boy to position and load the relatively small and maneuverable trailer separately and to then wheel it into mounting position with relation to his bike.

A further specific object of the present invention is to provide a trailer device for bikes, as described, having a self-locking coupling mechanism which prevents the inadvertent separation of the trailer while the same is in use, but which permits its quick and easy detachment when it is desired to use the bike separately. It is also possible, of course, to detach the trailer for use independently of a bicycle, if the bicycle should break down, for example, and in such a case the trailer can be easily and efficiently pulled by hand.

A further object is to porvide a trailer device for carrying newspapers or the like, as described, wherein the capacity of the trailer can be adjusted, depending upon the size of the load to be transported.

A further object is to provide a trailer device of the type described, wherein the newspapers or other objects carried therein are protected from snow, rain, and wind.

Still further objects of the present invention are to provide a trailer attachment for bicycles which is strong and durable, which device is relatively simple and inexpensive in construction, and which device is unusually well adapted for its intended purposes.

With the above and other objects in view, the invention consists of the improved trailer attachment for bicycles, and all of its parts and combinations, as set forth in the claims, and all equivalents thereof.

In the drawing accompanying and forming a part of this specification, wherein is shown a complete embodiment of the preferred form of the invention, and wherein like reference characters indicate the same parts in all of the views.

Figure 4:
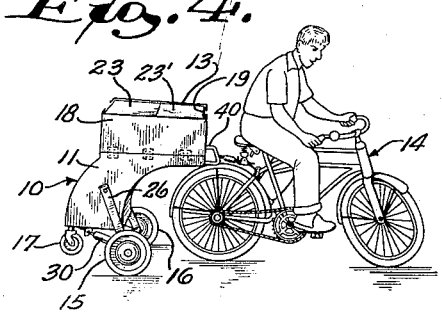
FIG. 4 is a perspective view of the trailer device fully loaded and mounted on the rear of a bicycle.

Referring now more particularly to the drawing, it will be seen that the main body portion 10 of the trailer is curved or arcuate when viewed in side elevation, being designed to extend partially around the rear wheel of a bicycle 14 (FIG. 4). Said body includes a pair of side walls 11 and 11', a front wall 12, and a bottom 22, and is supported by a pair of spaced wheels 15 and 16. A third wheel or caster 17 is also provided but does not ordinarily engage the ground, the function of said caster being to form, together with the wheels 15 and 16, a three-point support to maintain the trailer in an upright position when it is not attached to a bike.

Figure 5:
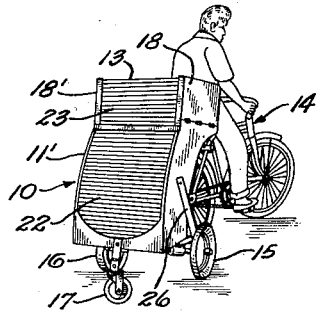
FIG. 5 is another perspective view of the loaded trailer attached to a bike, showing the rear of the trailer.

As illustrated in FIG. 5, the main body portion 10 of the trailer is designed to hold a stack of newspapers 22, considerably larger than that permitted by a conventional basket. In addition, the trailer has a disassemblable top section 13 provided by wall extensions 18, 18', and 19, hingedly attached to the upper ends of the body wall members. Ordinarily the extensions 18, 18', and 19 are arranged horizontally, forming a protective covering over the trailer top opening, but if the size of the load is unusually large said extension members can be swung to an upright position, as illustrated, to provide room for two additional stacks of newspapers 23 and 23'.

Figure 1:
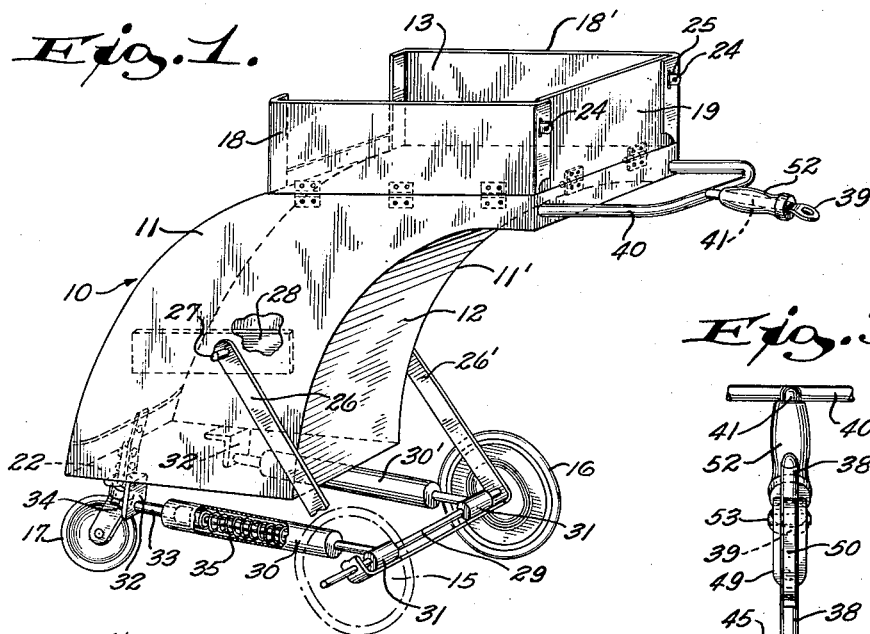
FIG. 1 is a perspective view of the improved trailer device, parts thereof being broken away.

As shown in FIG. 1, said side extension members 18 and 18' are flanged inwardly at their forward ends and the front wall extension 19 abuts said flanges when the members are in an upright position. To maintain said wall extensions erect, swiveled studs 24, formed on the member 19, are projected through slots 25 in the overlapping flanged portion of the side members and turned out of registration with said slots to a locked position.

As will be readily appreciated, the capacity of the trailer proper is substantially greater than that of an ordinary bicycle basket and makes it unnecessary for the delivery boy to make several trips back and forth from his loading point. Moreover, if the size of the route requires, or on Sundays or other days when the papers are larger than usual, the supplemental top section 13 may be employed to accommodate the increased load. In most cases, however, the trailer is large enough without utilizing the supplemental top section and the hinged extension members 18, 18′, and 19 may be left in their folded down position to help protect the papers from snow and rain. In the event of a severe storm it is possible, of course, to cover the exposed rear face of the trailer with a canvas cover or the like, such a cover being easily secured to and suspended from the folded-over extension members.

The mounting of the wheel and axle assemblage is an important element of the present invention and is shown in detail in FIG. 1. As illustrated therein, supporting arms 26 and 26′ are pivotally mounted on each of the trailer side wall panels 11 and 11′, and extend downwardly and forwardly at an angle from the true vertical, normally about 45 degrees. The upper ends of said supporting arms are pivotally secured to the wall panels by means of pins 27 extending laterally outwardly from said walls and projected through said arms. To disperse and minimize the shearing stress on the pins 27, each of said pins is mounted on an elongated, rigid board 28 secured along its entire length to the inner surface of the wall member, said pins being projected through openings in the wall provided therefor. Said pivot pins are positioned slightly below and forward of the wall panel vertical and longitudinal midpoints, respectively, thereby providing a resultant of forces which minimizes the load on the rear wheel of the bicycle, as will be hereinafter seen. In the illustrated construction, the supporting arms 26 and 26′ are formed by a one-piece, U-shaped member, but separate arms may also be used and the particular construction preferred is not critical to the invention.

The axle 29 is extended between and rotatably carried by the lower end portions of the supporting arms 26 and 26′, and the wheels 15 and 16 are mounted at opposite ends of said axle in a conventional manner. As will be appreciated, by virtue of the axle and supporting arm construction described, the trailer body is pivotal about the two axis points, being pivotal about the pins 27 connecting the same to the arms 26 and 26′, and said body and arms being pivotal together about the axle 29. The result of this novel two-point pivot arrangement is that the entire body and arm assemblage can not only swing rearwardly and downwardly about the axle in response to an increased load thereon, thereby shifting the load weight rearwardly and lessening the vertical force on the bicycle wheel, but the body can swing independently about the points 27 to maintain its same upright position despite the shift of the entire assemblage about the axle.

To regulate and limit the downward movement of the body when weight is added thereto, the trailer is provided with a pair of compression springs 35, which are housed in cylinders 30 and 30′ rotatably secured to the axle by means of sleeve couplings 31 (FIG. 1). Each of said springs is designed to resist the forward movement of a piston 33 as the trailer body rotates rearwardly and downwardly about the axle, the outer, fixed end of the piston rods being rigidly secured to brackets 32 mounted on the under side of the trailer bottom. The resistance increases, of course, as the body is lowered and the springs further compressed, finally reaching a point where the opposing forces are equal and the downward movement of the body arrested. To alter the length of the piston rods, and to thereby vary the ratio between the piston travel length and the load, it is merely necessary to turn the nuts 34 securing the piston rods to said brackets 32 inwardly or outwardly on the rods as desired. In addition to their primary function, said compression spring and piston mechanisms also serve as shock absorbers to promote the smooth and uniform riding motion of the trailer.

As a result of the cantilevered body and axle mounting described, it has been found that loads far in excess of those normally carried by a newspaper boy can be placed on the trailer without materially increasing the strain on the rear wheel of the bicycle. This of course is an important feature of the present invention as it substantially reduces the wear on the tire and eliminates the possibility of blowouts due to overloading.

Figure 3:
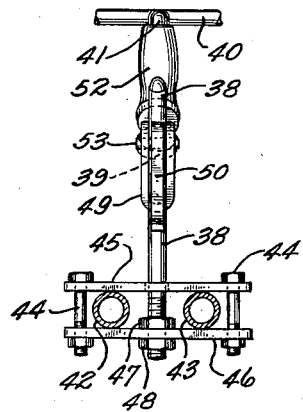
FIG. 3 is a top plan view of the coupling mechanism, taken along lines 3—3 of FIG. 2.
Figure 2:
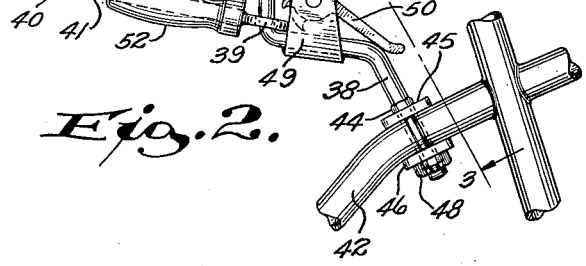
FIG. 2 is a side elevational view of the coupling mechanism employed to removably secure the trailer to the rear of a bike.

Referring now to the coupling mechanism shown in FIGS. 1, 2 and 3, it will be seen that the trailer has a horizontal, U-shaped bar 40 (FIG. 1) projecting outwardly from its front wall, and extending beyond said bar is a handle 41 having an eye 39 formed on its outer end. A crooked, upwardly-projecting coupling arm 38 is secured to the rear fork of the bike and is designed to be projected through said handle eye to releasably join the trailer and bike.

As will be seen in FIGS. 2 and 3, the coupling arm 38 is attached to the fork members 42 and 43 by means of a pair of plates 45 and 46 clamped onto said fork members by bolts 44, the threaded lower end of the coupling arm being projected through aligned apertures in said plates and rigidly maintained therein by nuts 47 and 48. The longitudinal central portion of the coupling arm is bent horizontally and has a U-shaped bracket 49 thereon adapted to pivotally support a lever arm 50. Said lever arm has a down-turned nose 51 at one end and is so mounted, with the pivot point 53 relatively close to said nose end, that the longer, heavier leg normally lies in a downwardly-inclined plane, the shorter nose end being raised and positioned in close proximity to the upwardly-projecting portion of the coupling arm.

As illustrated in FIG. 2, when the coupling arm 38 is projected through the eye 39 on the trailer handle, the presence of the protruding lever nose 51 prevents upward movement of said trailer handle and locks the same in position, the weight of the longer leg maintaining said lever nose end in its raised, obstructing position. When it is desired to detach the trailer, the longer leg of the lever may be manually raised, as shown in broken lines in FIG. 2, moving the nose end 51 downwardly about the pivot point 53 to an out of the way position where it will not interfere with the withdrawal of the trailer handle. Said coupling mechanism not only prevents the inadvertent separation of the trailer while the same is in use, the lever arm 50 forming an effective locking device, but said coupling permits the quick and easy detachment of said trailer when it is desired to use the bike or trailer alone, or when it is necessary to detach the trailer for loading or unloading.

When loading the trailer with newspapers, it has been found that it is frequently more convenient to disengage the compact and relatively maneuverable trailer and to wheel it right up to the loading station or platform, and in such instances the detachable nature of the coupling mechanism is a definite asset. After the trailer has been disengaged from the bike, the handle 41 may be grasped, there being a hand grip 52 provided therefor, and the trailer easily manually pulled to the desired location. The rear wheel or caster 17 permits the detached trailer to be set in an upright position, and the cantilevered frame mounting hereinbefore described prevents the trailer from tipping forwardly when loaded. When the loading operation has been completed, the trailer may be easily wheeled back into mounting position and attached to the delivery boy's bike.

A further feature of the present invention is that the trailer is designed to support a bicycle to which it is attached in an upright position at all times. The cantilevered suspension of the trailer frame maintains the same in an upright position and prevents its tipping forwardly, as described, and the coupling mechanism securing the same to a bike functions to support the bike in an upright position also. The result is that there is no need for the paper boy to carefuly stand his bike up each time he dismounts, which is both inconvenient and time-consuming.

As will be readily appreciated from the foregoing detailed description, the present invention comprises a trailer attachment for bicycles, for transporting newspapers or the like, which is not only novel but which constitutes a decided improvement over the front-mounted baskets commonly used for this purpose. The present trailer device has an unusually large capacity, it does not affect the maneuverability of the bike, it can be quickly and easily attached to or detached from the bike, and it subjects the bicycle tires to little or no strain. In addition, the trailer comprising the present invention is strong and durable and is adapted to effectively withstand the rugged use for which it is designed.

It is to be understood, of course, that various changes and modifications may be made without departing from the spirit of the invention as above described, and all of such changes are contemplated as may come within the scope of the following claims.

What is claimed as the invention is:

1. A trailer for bicycles, comprising: a body shaped to fit above and around the back of a bicycle rear wheel, said body having a pair of spaced side walls, a concave front wall, and a bottom; a pair of aligned and parallel arms secured to said side walls, one on each side wall, said arms extending downwardly and forwardly at an angle to a point below said body; an axle rotatably carried by and between the lower ends of said arms, said body and arm assemblage being pivotal rearwardly and downwardly about said axle in response to a load in said body to shift the load weight rearwardly relative to the bicycle, and to thereby lessen the vertical force on the bicycle rear wheel; means positioned between and connected to said body and said axle adapted to yieldably resist the pivotal movement of said body and arm assemblage about said axle with a predetermined force; a pair of wheels rotatably carried by the outer ends of said axle; and means on said trailer for releasably connecting the same to a bicycle.

2. A trailer for bicycles, comprising: a body shaped to fit above and around the back of a bicycle rear wheel, said body having a pair of spaced side walls, a concave front wall, and a bottom; a pair of aligned and parallel arms pivotally secured to said side walls, one on each side wall, said arms extending downwardly and forwardly at an angle to a point below said body; an axle rotatably carried by and between the lower ends of said arms, said body and arm assemblage being pivotal rearwardly and downwardly about said axle in response to a load in said body to shift the load weight rearwardly relative to the bicycle, and to thereby lessen the vertical force on the bicycle rear wheel, and said body being pivotal independently about its connection with said arms to maintain an upright position irrespective of the pivotal movement of said body and arm assemblage about said axle; means positioned between and connected to said body and said axle adapted to yieldably resist the pivotal movement of said body and arm assemblage about said axle with a predetermined force; a pair of wheels rotatably carried by the outer ends of said axle; and means on said trailer for releasably connecting the same to a bicycle.

References Cited in the file of this patent

UNITED STATES PATENTS

| | | |
|---|---|---|
| 1,251,866 | Cordaro | Jan. 1, 1918 |
| 1,428,166 | Headley | Sept. 5, 1922 |
| 1,509,710 | Chambers | Sept. 23, 1924 |
| 2,370,988 | Neal | Mar. 6, 1945 |
| 2,555,767 | Simonian | June 5, 1951 |
| 2,707,795 | Skupas | May 10, 1955 |

FOREIGN PATENTS

| | | |
|---|---|---|
| 629,785 | Germany | May 11, 1936 |
| 431,951 | Italy | Mar. 10, 1948 |